United States Patent
Rosenmayer

(10) Patent No.: US 6,605,381 B1
(45) Date of Patent: Aug. 12, 2003

(54) POLYMER-ELECTROLYTE MEMBRANE FUEL CELL

(75) Inventor: Volker Rosenmayer, Saaldorf-Surheim (DE)

(73) Assignee: Manhattan Scientifics, Inc., New York, NY (US)

( * ) Notice: Subject to any disclaimer, the term of this patent is extended or adjusted under 35 U.S.C. 154(b) by 0 days.

(21) Appl. No.: 09/786,465

(22) PCT Filed: Sep. 2, 1999

(86) PCT No.: PCT/DE99/02776

§ 371 (c)(1), (2), (4) Date: Mar. 5, 2001

(87) PCT Pub. No.: WO00/14816

PCT Pub. Date: Mar. 16, 2000

(30) Foreign Application Priority Data

Sep. 4, 1998 (DE) .......................................... 198 40 517

(51) Int. Cl.⁷ ................................................ H01M 2/14
(52) U.S. Cl. ............................ 429/39; 429/38; 429/34; 429/33; 429/30; 429/40; 429/41; 429/42; 502/101; 427/115; 29/730; 29/623.3; 29/623.5; 29/623.1
(58) Field of Search .............................. 429/42, 41, 40, 429/39, 38, 33, 30, 34; 502/101; 427/115; 29/623.3, 623.5, 623.1, 730

(56) References Cited

U.S. PATENT DOCUMENTS

| 4,804,592 A |   | 2/1989  | Vanderborgh et al. ........ 429/33 |
| 5,500,292 A | * | 3/1996  | Muranaka et al. ............. 429/33 |
| 5,620,807 A |   | 4/1997  | Mussell et al. ................ 429/33 |
| 5,641,586 A |   | 6/1997  | Wilson .......................... 429/30 |
| 5,882,810 A | * | 3/1999  | Mussell et al. ................ 429/33 |
| 5,998,057 A | * | 12/1999 | Koschany et al. ............. 429/42 |
| 6,020,083 A | * | 2/2000  | Breault et al. ................. 429/39 |
| 6,024,848 A | * | 2/2000  | Dufner et al. ................. 429/39 |

FOREIGN PATENT DOCUMENTS

| EP | 560 295     | 9/1993 |
| WO | WO97/13287  | 4/1997 |
| WO | WO97/20359  | 6/1997 |
| WO | WO98/39809  | 9/1998 |

* cited by examiner

Primary Examiner—Bruce F. Bell
(74) Attorney, Agent, or Firm—James Creighton Wray; Meera P. Narasimhan

(57) ABSTRACT

Not all gas diffusion structures known to date can guarantee water balance compensation in the fuel cell, protection against drying and prevention of water deposits while simultaneously ensuring even distribution of reaction gases. In the gas diffusion structure, according to the invention, a gradient is produced in terms of gas permeability perpendicular to the membrane by way of a stratified system. This guarantees, at an appropriate operating temperature and appropriate stoichiometry of the reactants, constant and optimal humidification in all points of the membrane by the formed product water. Additional humidification systems can thus be discarded.

12 Claims, 1 Drawing Sheet

POLYMER-ELECTROLYTE MEMBRANE FUEL CELL

BACKGROUND OF THE INVENTION

The present invention relates to a polymer-electrolyte membrane fuel cell comprising a laminate of such membrane, an electrode containing a catalyst, a porous, electrically conductive gas diffusion layer and a current collector plate having a gas distribution channel structure, the cell having a gradient of the gas permeability, which gradient is present at least in a partial area, in the laminate in the direction perpendicularly to the membrane, with a higher gas permeability closer to the membrane an a lower gas permeability closer to the current collector plate, wherein in operation at the membrane by a hydrogen-oxygen reaction water and heat are produced. The invention further relates to a method for manufacturing such fuel cell.

The polymer-electrolyte membrane fuel cell or PEM fuel cell is operated with the reaction gases hydrogen and oxygen or air. According to a known structure (EP 0560295A), it consists of, arranged from the outside to the inside, two current collector plates with gas diffusion layers, two electrodes containing the catalyst and an ion exchange membrane located between the electrodes, with the ion exchange membrane and the electrodes forming the membrane-electrode-unit (hereinafter referred to as MEA—membrane electrode assembly). Typically the current collector plates contain structures than extend parallel to the MEA for supplying and distributing the reactants across the entire surface of the cell. Since the voltage of each individual cell is much too low for any practical applications, a multitude of these cells must be serially arranged. In the resulting fuel cell pile or fuel cell stack, the coinciding current collector plates are replaced with so-called bipolar plates whose function consists of directing the current though the stack and of isolating the reaction gases.

By supplying hydrogen which is a typical reaction gas to the fuel cell anode side which is positioned in a gas compartment sealed off to the outside, cations are generated on the anode side catalyst layer which cations diffuse though the ion exchange membrane. Simultaneously, the electrons that were also produced are directed via an outer electric circuit with a load resistor from the anode to the cathode. The supplied oxidation agent is oxygen, and preferably the oxygen concentration in ambient air is sufficient; this oxygen is now reduced in the cathode by way of reception of the hydrogen ions and electrons. Water results as a reaction product. The reaction enthalpy is released in the form of electric energy and dissipated heat.

An essential problem in this process is the water economy of the fuel cell. In the initially mentioned known fuel cell (EP 0560295A) the water economy particularly in the electrode layer which contains the catalyst is influenced by means of hydrophobic coatings covering the catalyst carrier which itself is covered by the catalyst. In order that the catalyst still comes into contact with the reactants, in this layer the porosity increases towards the membrane. In the area of low porosity a higher percentage, in the area of the high porosity a lower percentage of the catalyst is inactive. The water generation takes place over all of the thickness of the layer and can also deactivate parts of the catalyst by flooding. On the other hand, the membrane is able to perform under optimal conditions, i.e. it conducts the hydrogen ions optionally, only if it contains a sufficient amount of moisture. If the moisture content drops too low, the internal resistance of the cell increases considerably due to the increased membrane resistance, thereby reducing performance. Thus, for an optimal cell operation at a given temperature it is necessary that the air's humidity is at almost 100 percent at each and every place of the membrane. If the cathode gas air flows through the distribution channels of the current collector plates and diffuses through the gas diffusion layer, it has a low partial pressure with regard to water vapor upon entering the gas compartment, and a high one upon exiting because oxygen reacts to form water at the cathode. The diffusion flow between the membrane's surface and the distribution channel, which is caused by the partial pressure differences of hydrogen, dries the membrane at the entry point of the cathode gas, and at the exit point, on the other hand, water deposits may occur in the diffusion layer. At a given operating temperature and in order to compensate for differences in the water balance of the membrane it is therefore necessary to achieve a composition of the cathode gas that is as constant as possible across the membrane's surface; the same applies for the anode gas.

With conventional methods this problem is only partially solved using external humidification systems, at times in combination with cooling systems, which systems, by way of measuring the membrane moisture at least in intervals, provide for water balance adjustments of the cell. It is a disadvantageous aspect of these humidification systems that they place an additional burden on the fuel cell system in terms of internal energy consumption and also weight, which is particularly undesirable for their application in small, portable systems, as well as in terms of additional cost thereby reducing the competitiveness of the fuel cell in comparison with conventional energy supply systems. Furthermore, the above solution does not address the problem of how to achieve an even gas distribution on the surface of the catalyst and of the cell membrane. The objective is to operate a fuel cell without humidifying the reaction gases.

Electrode-catalyst layers which are porous and such allow some gas diffusion are also known from WO 97/20359. These layers may also consist of a laminate of several films and can be reinforced by a conductive grid. However, they do not have a gradient of the gas permeability.

U.S. Pat. No. 5,641,586 shows one solution as to how to achieve a uniform distribution of the reaction gases. It provides that two layers are arranged between the electrode catalyst layer and the current collector plate; adjacent to the MEA is a macro-porous, hydrophile gas diffusion layer, and adjacent to the current collector plate is a macro-porous, hydrophilic flow field. The flow field has two intermeshing channel structures, on the one hand, for distributing the reaction gases at the gas diffusion layers and, on the other hand, for removing the reaction products. Although this apparatus allows the even distribution of the reactants across the surface of the membrane and water deposits are also avoided by way of the application of a hydrophobic layer, the danger of drying continues to remain a threat because the gas diffusion layer does not prevent the reaction product from exiting even if the membrane has an insufficient moisture supply.

One way for maintaining the water economy of a fuel cell on a constant and optimal level is shown in DE-OS 14 96 172, according to which a water diffusion electrode made of a palladium/gold alloy is used which is permeable for hydrogen but prevents the penetration of fluids. However, this design is not suitable for use at the cathode, where the problem of having to compensate for water imbalances primarily is since this electrode is not permeable for oxygen.

SUMMARY OF THE INVENTION

Thus, the object of the present invention is to replace the conventional gas diffusion layer of the PEM fuel cells with a gas diffusion structure whose diffusion properties are dimensioned in such a way that the water balance at the MEA is always uniform.

The fuel cell of the present invention is to be manufactured by a simple, inexpensive method for producing such gas diffusion structure.

According to the invention these objects are accomplished by a gas diffusion structure which is characterized in that the gas permeability gradient exists in the gas diffusion layer which is adjacent to the electrode containing the catalyst, and that at least in said partial area of the gas diffusion layer the gas permeability closer to the current collector plate is lower to such a degree than in the vicinity of the membrane that a gas composition occurs which over the surface of the membrane is approximately constant, and the water which at the operating temperature is generated in vaporform creates such a water vapor diffusion stream through the gas diffusion layer that such a humidity content of the membrane which is optimal for the conductivity is materially being maintained, and by a method for producing the gas diffusion structure, which method is characterized in that the gas diffusion layer is produced with a gas permeability increasing in the direction toward the membrane. The gradient is thus provided for in the gas diffusion layer which for the purpose of gas diffusion must have a certain thickness and wherein the generation of the water takes place beyond the delimiting face oriented toward the catalyst. The water vapor defuses in an administered stream of vapor out of the inner zone of the cell in such a manner that along all of the membrane approximately equal gas access conditions and humidity conditions exist which conditions can be adjusted to be optimum.

BRIEF DESCRIPTION OF THE DRAWINGS

The drawing shows a preferred embodiment of a gas diffusion structure according to the invention in correspondence with the examples.

DETAILED DESCRIPTION

Figure 1:
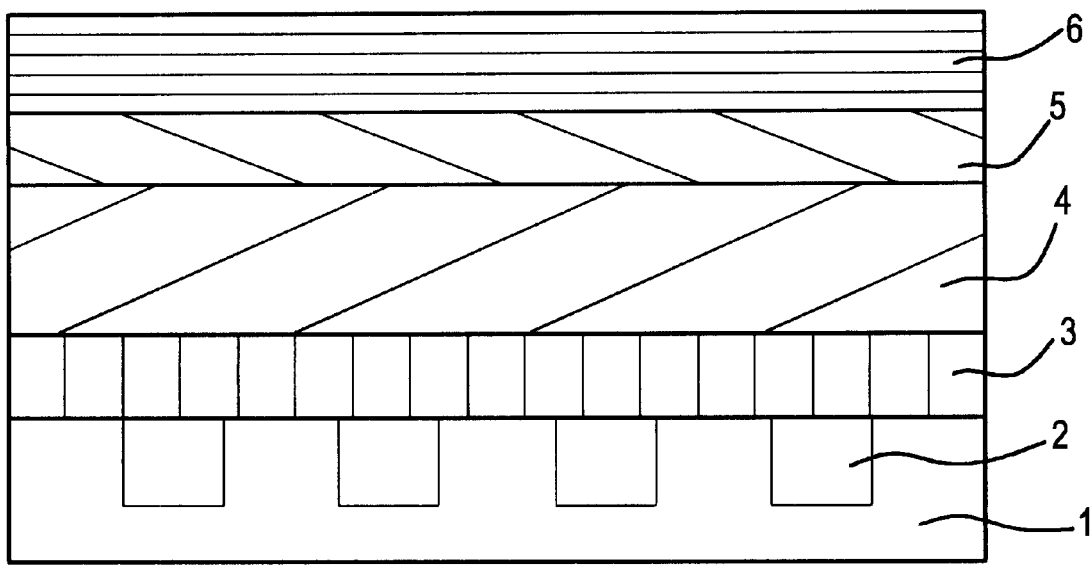

The depicted fuel cell comprises a current collector plate 1 having channels 2 for the distribution of the reaction gases, an outer layer 3 and an inner layer 4 of a gas diffusion structure, an electrode 5 having a catalyst film, and a polymer-electro-lyte membrane 6; at the opposite side of this membrane 6, non-depicted cathodic structural elements follow.

Normally the gas diffusion structure 3, 4 consists of porous, electrically conductive materials and is an orthogonale structure that must be adapted with respect to their pore volumes in order to achieve a gradient in terms of gas permeability. This can be accomplished in layers or continually. An almost continual change could be accomplished if a large number of very thin layers with respectively somewhat varying diffusion properties are laminated; at a minimum, and subsequently also preferably, two layers 3, 4 with different gas permeability properties are required.

The outer layer 3, i.e. the part of the gas diffusion structure which is located adjacent to the current collector plate 1 having the channels 2, has a relatively small pore volume and consequently a high diffusion resistance. The inner part 4 of the gas diffusion structure, however, i.e. the part that contacts the electrode 5 which contains the catalyst, has a relatively high pore volume. Therefore, the reaction gases get distributed sufficiently well by way of diffusion within the layer 4, also at distances (0.5 to 5 mm) approximately in range of the projecting ribs of the current collector plate 1.

Moreover, the outer layer 3 of the orthogonal gas diffusion structure is preferably realized as more hydrophobic than the inner layer 4.

This two-layered gas diffusion structure can further be supplemented with additional layers that have respectively different functions. Adding another layer to the inner layer 4 between the electrode 5 and this layer 4, can be indeed advantageous. The purpose for such additional layer is the superficial filling and smoothing of the for mostly coarse pores of the layer 4 which provides a better contact between the gas diffusion structure and the electrode. A method for manufacturing this layer is described in example 3.

Also, another layer can be added between the outside layer 3 and the projecting ribs of the current collector plate 1. The purpose for such a layer consists of keeping the electric contact resistance to the channel structure as low as possible. For this, the layer could be deformable by plasticity or elasticity thereby allowing that the dimensional tolerances of the current collector plates or, in the case of an arrangement in a fuel cell stack, of the bipolar plates are compensated for and the current collection from the gas diffusion structure can occur evenly.

Subsequently, the way in which the gas diffusion structure consisting of both layers 3 and 4 functions, will be outlined. The adjustable operational parameters of the fuel cell are the air ratio [ratio air stream: air chemically consumed] or the hydrogen stoichiometry, the operating pressure, the water vapor content of the reaction gases at the cell entry point and the operating temperature. The temperature should be chosen as high as possible in order to allow for a compact cooling system with low coolant throughput. The simplest, conceivable cooling system consists merely of a fan that transports a amount of air sufficient for the cooling purpose into the cathode compartment of the cell or of the stack. The adjustable operating pressure should be chosen a low a possible; ideally the fuel cell should be operated at ambient pressure. Thus, compressor-related energy losses can be avoided. Moreover, this represents a reduction in weight and expense.

During operation in accordance with these or similar conditions the problem focus with regard to a uniform water balance is placed primarily on the danger of the membrane to dry out and not on water deposits in the pores of the gas diffusion structure. For purposes of preventing such dry out, in particular on the cathode side an approximately constant gas composition across the entire surface of the membrane and an approximately constant gas composition in the channel structure of the current collector plate is demanded. This is accomplished by adopting a relatively large air ratio (e.g. 8 to 70) through the channels 2 of the current collector plate 1. Under these conditions, changes of the composition of the gas due to the withdrawal of oxygen and the release of water vapor by the cell are negligible. The diffusion resistance of the layer 3 of the gas diffusion structure according to the invention must be such that the gradient in the water vapor's partial pressure, occurring at the desired operating temperature between the well-moistened membrane and the gas in the cathode compartment causes a water vapor diffusion flow that carries away just the generated product water. Therefore, the essential oxygen and water vapor gradients do not occur, as is customary, in a parallel direction but in a vertical direction in relation to the surface of the membrane 6. The operating conditions are thus constant across the entire surface of the membrane. The layer 4 has the purpose to distribute the gases uniformly at that area of the projecting ribs wherein the diffusion flow is interrupted.

If a relatively low air ratio is desired which causes changes in the composition of the cathode gas on its way through the cell to be noticeable, the diffusion resistance of the outer layer 3 must be adjusted to these conditions. At the point of gas entry the layer 3 must be realized with a higher diffusion resistance than at the gas exit point. In addition, in this manner a performance reduction based on changes of the operating temperature inside of cell can be avoided by an adjustment of the diffusion resistance.

The gas diffusion structure of the invention is suited for advantageous application not only at the cathode, as has been described here by way of example, but also at the anode, in particular if the cell is operated with non-moistened hydrogen.

The production of such orthogonal gas diffusion structure on the catalytic electrode, with the gradient in terms of gas permeability, is described in the following upon use of examples.

EXAMPLE 1

The gradient in terms of gas permeability perpendicular to the membrane 6, is accomplished by hot-pressing a foil consisting of a thermoplastic synthetic material supposed to constitute the layer 3 onto a carbon fiber paper 4 which is homogenous in terms of its diffusion properties and which is supposed to constitute the layer 4. The hot-pressing causes the thermoplastic synthetic material to be distributed inside the pores close to the one surface of the carbon fiber paper and results in a partial obstruction of the pores. Surprisingly, the electric conductivity perpendicular to the layer is not lost thereby because the carbon fibers penetrate the foil and the electric current therefore reaches the surface again.

Preferably, the initial pore volume of the carbon fiber paper is more than 50%, and in particular, preferably it exceeds 70%. Before it is processed further, it can be impregnated with polytetrafluoroethylene (PTFE) (5 to 40 mass %) in accordance with the method described in example 2. The thickness of the carbon fiber paper is preferably 0.1 mm to 1.5 mm, and in particular preferably 0.2 mm to 0.4 mm.

In order to render the foil of the thermoplastic material hydrophobic they consist preferably of fluorinated synthetic materials, such as the products e.g. THV and FEP of the Dyneon company. But also suitable for use are conventional thermoplastics, such as polypropylene. The thickness of the foil is preferably 0.01 mm to 0.2 mm. The diffusion resistance can be adjusted within wide limits, depending on the intended purpose, by choosing the foil thickness and the pressing conditions.

The temperature during hot-pressing is preferably selected in a range that is somewhat above to somewhat below the melting range of the used thermoplastic. The pressing pressures are preferably between 10 bar and 100 bar, in particular preferred are pressures of 30 bar to 80 bar. If possible, the fibers of the carbon fiber paper should not break due to the pressing.

The other surface of the carbon fiber paper can be coated with an electrode of a catalyst-containing material, or it can be placed or pressed directly onto a previously catalyzed membrane. In the latter case, however, it is advantageous to apply a smoothing layer compensating for the surface roughness of the carbon fiber paper, as outlined in example 3.

EXAMPLE 2

The pores, in part obstructed with a synthetic material, in accordance with example 1, can also be produced by drenching a carbon fiber paper with suspended synthetic materials, preferably PTFE or THV. Since it is very complicated to achieve a gradient in perpendicular direction to the paper's surface by way of drenching in only one single carbon fiber paper, two carbon fiber papers are to be used, one of which which is supposed to constitute the outer layer 3 containing a relatively high amount of synthetic material and thus resulting in a higher diffusion resistance, and the other one of which which is supposed to constitute the inner layer 4 containing a relatively high number of unobstructed pores. The second carbon fiber paper can then be equipped with a catalyst-containing electrode layer or with a layer compensating for the roughness of the carbon fiber paper, as shown in example 3, and can then be placed or pressed correspondingly onto the membrane which may be non-catalyzed or catalyzed. The specifications referred to in example 1 apply for both carbon fiber papers here as well.

Specifically for the present example two carbon fiber papers with a thickness of 0.17 mm for the first layer 3 and of 0.35 mm for the second layer 4, manufactured by the Toray company (Japan), are used. The first paper is partially filled with synthetic material by drenching with a 60% aqueous PTFE dispersion, followed by drying at a higher temperature. A single process step consisting of drenching and drying, however, is generally not sufficient to achieve the desired diffusion resistance, and repeating this process step only adds minimal amounts only to the carbon fiber paper since the hydrophobic synthetic material already adsorbed prevents for the most part any further penetration of the dispersion into the pores. Higher filling rates can only be achieved by vacuum and pressure treatments, performed subsequently one after the other, during the impregnating process. After the carbon fiber paper is impregnated the remaining surface-active agents from the dispersion are thermally destroyed, for which purpose temperatures of between 300° C. and 400° C. are typically applied for a short time.

The completed layer is extremely hydrophobic. It contains 45% to 75% synthetic material if applied for a gas diffusion structure on the cathode side of a PEM fuel cell to be operated at ambient pressure and at a 70° C. cell temperature with air cooling of the cathode compartment. The conductivity of the layer is not essentially affected by this because inside the carbon fiber paper the conductive connections between the carbon fibers are not dissolved. The second carbon fiber paper, which may be treated to have slight hydrophobic properties, is press-compacted with the first paper or it is only added during the assembly of the cell.

EXAMPLE 3

A laminate system with very good electric conductivity properties, which has a suitable gradient in the diffusion resistance, can also be manufactured by applying a mixture consisting of an electrically conductible powder and of a binder to a substrate with a low diffusion resistance, e.g. carbon fiber paper.

Specifically for this example a carbon fiber paper, treated to exhibit hydrophobic properties, with a pore volume of 68% and a thickness of 0.35 mm is used. In general, carbon fiber papers with the specifications referred to in example 1 are adequate. A dispersion of graphite powder, THV (Dyneon company) or PTFE (e.g. Hostaflon TF 5032) in suitable aqueous dispersion fluids is sprayed onto this substrate in one or several spraying steps while allowing time to dry between the spraying steps. Aqueous tenside solutions or mixtures consisting of water and types of alcohol can be used as dispersion fluids. Carbon powder is preferably suitable as an electrically conductible powder, and in particular preferred are globular-shaped carbon particles, such as e.g. Mesocarbon Microbeads obtainable from the company Osaka Gas, Japan.

Preferably the spraying is carried out on a vacuum table allowing for an immediate removal of excess dispersion fluid by suction. After the last drying step the synthetic particles are sintered at increased temperatures, and the surface-active agents are destroyed. The percentage of synthetic binder is preferably 5% to 50% of the dry mass. The area specific mass of the layer is preferably between 30 g/m$^2$ and 300 g/m$^2$, particularly preferred between 60 g/m$^2$ and 120 g/m$^2$. After the sintering process is complete the substrate with the applied layer are press-compacted at between 5 bar and 100 bar, preferably at 30 bar to 80 bar, at an increased temperature.

To compensate for the roughness of the carbon fiber paper on the side facing the membrane or the catalyst, it is useful to apply a very thin layer of a dispersion consisting of porous carbon black (e.g. Vulcan XC 72 by the Cabot company) and a polymeric binder (e.g. PTFE) by way of spraying, possibly on the vacuum table, drying and subsequent sintering. Again, the preferred rate of synthetic material is 5% to 50%. This layer can also be press-compacted using the pressures indicated above.

EXAMPLE 4

For purposes of impregnating the carbon fiber paper, as a variation of example 2, it is possible to use, instead of the fluorinated synthetic material, a mixture of electrically conductive particles with an e.g. fluorinated synthetic material as a binder. The advantage is the somewhat superior electric conductivity of the gas diffusion structure.

Suitable electrically conductive particles are graphite, conductive carbon black or short carbon fibers. Specifically for the present example a suspension consisting of 50 g water, 16.6 g of 60% PTFE suspension and 10 g graphite with a medium particle size of 15 $\mu$m can be used for impregnating. After the appropriate solid matter mass for the application purpose (e.g. 2 mg/cm$^2$ to 10 mg/cm$^2$) is achieved the layer material is sintered in order to solidify the structure and to thermally disintegrate the supplementary dispersion materials. The impregnation process, accompanied by intermittent drying, can be repeated several times.

If also in parallel to the layer surface, a gradient in the diffusion resistance is desired due to the specific application, such gradient can easily be achieved by way of applying respectively different numbers of impregnation steps on different partial areas. Preferred in this case is the impregnation of partial areas of the diffusion electrode by way of spray application of the suspension and allowing it to soak in accordance with example 2 or example 4.

The gradient in the diffusion resistance perpendicularly to the layer can be achieved by attaching another carbon fiber paper either on the side facing the membrane or on the side off from it.

In the alternative, a layer applied in accordance with example 3 and consisting of highly porous carbon black can also be used for this purpose. Possible application techniques are spraying, applying by doctor, rolling or screen print. Preferably herein, solid material loads of 0.4 mg/cm$^2$ to 3.5 mg/cm$^2$ are used.

REFERENCE LIST (1) current collector plate
(2) channels for distributing the reaction gases
(3) outer layers of the orthogonal gas diffusion structure
(4) inner layers of the orthogonal gas diffusion structure
(5) catalyst-containing electrode
(6) polymerelectrolyte membrane

What is claimed is:

1. A polymer-electrolyte membrane fuel cell comprising a laminate of such membrane (6), an electrode (5) containing a catalyst, a porous, electrically conductive gas diffusion layer (3, 4) and a current collector plate (1) having a gas distribution channel structure (2), the cell having a gradient of the gas permeability, which gradient is present at least in a partial area, in the laminate in the direction perpendicularly to the membrane, with a higher gas permeability closer to the membrane (6) an a lower gas permeability closer to the current collector plate (1), wherein in operation at the membrane by a hydrogen-oxygen reaction water and heat are produced, characterized in that the gas permeability gradient exists in the gas diffusion layer (3, 4) which is adjacent to the electrode (5) containing the catalyst, and that at least in said partial area of the gas diffusion layer (3, 4) the gas permeability closer to the current collector plate (1) is lower to such a degree than in the vicinity of the membrane (6) that a gas composition occurs which over the surface of the membrane (6) is approximately constant, and the water which at the operating temperature is generated in vapor-form creates such a water vapor diffusion stream through the gas diffusion layer that such a humidity content of the membrane which is optimal for the conductivity is materially being maintained.

2. Fuel cell according to claim 1, characterized in that the electrically conductive gas diffusion layer (3, 4) consists of a plurality of partial layers (3; 4) following each other along the thickness, the specific gas permeabilities of these partial layers increasing towards the side of the membrane from one partial layer to the next.

3. Fuel cell according to claim 1, characterized in that the electrically conductive gas diffusion layer (3, 4) has a higher pore volume dentity in the zones with the higher gas permeability than in the zones with the low gas permeability.

4. Fuel cell according to claim 1, characterized in that the gas diffusion layer (3, 4) has a gas permeability gradient also in a direction parallel to the membrane (6).

5. Method for producing a polymer electrolyte membrane fuel cell according to claim 1, the cell comprising a porous, electrically conductive gas diffusion layer (3, 4) which is arranged along such a membrane with an electrode (5) containing a catalyst being arranged inbetween, the method comprising producing that gas diffusion layer (3, 4) with a gas permeability gradient in the direction of its thickness, characterized in that the gas diffusion layer (3, 4) is produced with a gas permeability increasing in the direction toward the membrane (6).

6. Method according to claim 5, characterized in that the gas diffusion layer is produced in the form of at least two partial layers (3, 4) with different gas permeabilities, and that in the fuel cell the partial layer or layers having the higher gas permeability are located at the membrane.

7. Method according to claim 6, characterized in that the different gas permeabilities are obtained by producing different pore volume densities.

8. Method according to claim 5, characterized in that the gas diffusion layer is produced of porous carbon fibre paper and that for obtaining the different gas permeability, the pores of the carbon fibre paper near one of its surfaces is partially closed by a thermoplastic synthetic material by putting onto this surface a foil while exerting pressure and elevated temperature.

9. Method according to claim 5, characterized in that for obtaining the different gas permeabilities, starting out from a layer material having uniform gas permeability, the pores of the porous gas diffusion layer are partially closed with a suspension of plastic particles.

10. Method according to claim 9, characterized in that the gas diffusion layer is produced of porous carbon fibre paper and the suspension is introduced into the carbon fibre paper by drenching and drying.

11. Method according to claim 5, characterized in that for obtaining the non-uniform gas permeabilities, starting out from a layer material having uniform gas permeability, at one of the surfaces of the gas diffusion layer a further layer of electrically conductive particles and binder particles are deposited.

12. Method according to claim 11, characterized in that the further layer is deposited by suspending the conductive particles which preferably consist of carbon and the binder particles which preferably consist of fluorinated synthetic material in a suspension and spraying this suspension on the respective surface of the gas diffusion layer, then drying and possibly sintering the layer.

* * * * *